United States Patent
Wakabayashi et al.

(10) Patent No.: US 6,454,164 B1
(45) Date of Patent: Sep. 24, 2002

(54) POCKET-SIZE INFORMATION TRANSFER APPARATUS HAVING DUAL IC CARD INSERTION SLOTS AND IC CARD USING THE SAME

(75) Inventors: Manabu Wakabayashi, Yokohama; Shigeyuki Itoh, Kawasaki; Yuhei Abe, Hitachinaka; Kaoru Harada, Ibaraki-ken; Atsuhiko Urushihara, Kokubunji, all of (JP)

(73) Assignee: Hitachi, Ltd., Tokyo (JP)

( * ) Notice: Subject to any disclaimer, the term of this patent is extended or adjusted under 35 U.S.C. 154(b) by 998 days.

(21) Appl. No.: 08/690,966

(22) Filed: Aug. 1, 1996

(30) Foreign Application Priority Data

Aug. 9, 1995 (JP) .............................. 7-203053

(51) Int. Cl.[7] .............................. G06F 17/60
(52) U.S. Cl. ..................... 235/380; 235/379; 235/441
(58) Field of Search ................. 235/380, 375, 235/379, 383, 385, 440, 441, 439, 451, 483, 486, 492; 902/5, 25, 26

(56) References Cited

U.S. PATENT DOCUMENTS

| | | | |
|---|---|---|---|
| 4,594,663 A | * | 6/1986 | Nagata et al. .......... 235/380 X |
| 4,709,136 A | * | 11/1987 | Watanabe .................. 235/379 |
| 4,774,399 A | * | 9/1988 | Fujita et al. ............... 235/441 |
| 4,802,218 A | * | 1/1989 | Wright et al. ........... 235/492 X |
| 4,862,501 A | * | 8/1989 | Kamitake et al. ....... 235/380 X |
| 4,900,903 A | * | 2/1990 | Wright et al. ............... 235/380 |
| 5,010,237 A | * | 4/1991 | Kawana .................... 235/379 |
| 5,049,728 A | * | 9/1991 | Rovin ....................... 235/492 |
| 5,184,282 A | * | 2/1993 | Kaneda et al. ............ 361/737 |
| 5,204,512 A | * | 4/1993 | Ieki et al. .................. 235/382 |
| 5,352,875 A | * | 10/1994 | Enomoto .................. 235/380 |
| 5,434,395 A | | 7/1995 | Storck et al. .............. 235/380 |
| 5,451,763 A | * | 9/1995 | Pickett et al. ............. 235/492 |
| 5,563,400 A | * | 10/1996 | LeRoux .................... 235/486 |
| 5,679,007 A | * | 10/1997 | Potdevin et al. ....... 439/945 X |
| 5,691,525 A | * | 11/1997 | Aoki et al. ................ 235/379 |
| 6,189,786 B1 | * | 2/2001 | Itou et al. .................. 235/379 |

FOREIGN PATENT DOCUMENTS

| | | |
|---|---|---|
| DE | 297 14 415 U1 * | 12/1997 |
| JP | A-6-20106 | 3/1994 |

* cited by examiner

Primary Examiner—Michael G. Lee
Assistant Examiner—Jared Fureman
(74) Attorney, Agent, or Firm—Antonelli, Terry, Stout & Kraus, LLP

(57) ABSTRACT

A pocket-size information transfer apparatus includes two insertion slots in which IC cards for storing electronic information are inserted and which are open on the owner's side and the other party's side and an IC card operation unit for reading and writing electronic information in the IC cards inserted into the two insertion slot. The owner's IC card is inserted into one of the two insertion slots having a deeper depth and the other party's IC card is inserted in the other insertion slot having a shallow depth.

14 Claims, 15 Drawing Sheets

POCKET-SIZE INFORMATION TRANSFER APPARATUS HAVING DUAL IC CARD INSERTION SLOTS AND IC CARD USING THE SAME

BACKGROUND OF THE INVENTION

The present invention relates to a pocket-size information transfer apparatus in which information such as electronic money, name cards and short text in the fixed form and the like is stored in an integrated circuit (IC) and the information is exchanged and an IC card using the apparatus.

As a technique of this kind, JP-A-6-20106discloses an electronic purse. The electronic purse includes two slots for inserting two IC cards and electronic money information is transferred between the two IC cards inserted into the two slots.

SUMMARY OF THE INVENTION

It is an object of the present invention to provide a pocket-size information transfer apparatus easy to use.

It is another object of the present invention to provide an IC card which is made small and used easily.

It is another object of the present invention to provide an IC card capable of utilizing electronic information included in another IC card even if electronic information stored in the IC card is lacking.

In order to achieve the objects of the present invention, according to a first aspect of the present invention, the pocket-size information transfer apparatus comprises two insertion slots provided at the owner side and the other party side and an IC card operation unit for reading and writing electronic information in respective IC cards inserted into the two insertion slots.

The two insertion slots in the pocket-size information transfer apparatus are different in the depth thereof and are structured so that the two IC cards inserted into the slots do not overlap each other or do overlap each other. The apparatus having the overlapped structure has a short length in the longitudinal direction thereof and is made small in structure.

The depth of one of the two insertion slots is substantially equal to the length of the inserted IC card and the depth of the other slot is made shorter than the length of the inserted IC card so that the IC card having the standard size and the IC card having the length shorter than the standard size IC card can be inserted into the apparatus.

The owner's IC card is inserted into the insertion slot having a larger depth and the other party's IC card is inserted into the insertion slot having a small depth, so that the owner of the apparatus can carry the apparatus while the IC card is inserted into the apparatus.

The IC card operation unit includes an operation portion having operation keys disposed at the surface of a substantially rectangular housing, a display unit for displaying information, and terminals formed in one side portion of the housing and connected to a modem to transmit and receive information from the outside. The operation keys include numerical keys and functional keys. Particularly, by providing alpha-numerical keys, when electronic information is inputted or outputted, item names can be recorded in the information transfer apparatus. When the electronic information stored in the IC card is money information, the information can be transferred from the terminals through the modem to a bank account. Further, when money is lacking, the money information can be read in the IC card from the bank account. In addition, the information transfer apparatus can be connected to a printer or a facsimile to print electronic information stored in the IC card.

The IC card operation unit includes a detection switch which abuts against an edge formed along a longitudinal direction of the IC card when the IC card is inserted into the insertion slot to thereby detect the IC card and for detecting a notch formed in one side extending along the longitudinal direction of the IC card. Accordingly, the IC cards of both types can be detected by the single detection switch.

Since the electronic information stored in the IC card includes money information containing item names expressing incomings and outgoings, name card information and short sentence information, there can be provided the pocket-size information transfer apparatus having wide extent of utilization.

According to a second aspect of the present invention, the IC card is a combined IC card comprising a mini-IC card including integrated circuits (ICs) for storing at least electronic information and mounted in a board and an adapter plate for mounting said mini-IC card. Thus, when the electronic information stored in the IC card is lacking, the mini-IC card included in a portable telephone or another apparatus can be used as a temporary makeshift.

The combined IC card includes a recess formed in a predetermined position in the adapter plate and having the same external shape as that of the mini-IC card and a window hole formed in the recess through a step. The mini-IC card is fitted into the recess. Thus, the mini-IC card used as a temporary makeshift as described above can be removed easily by pushing the mini-IC card by a finger through the window hole.

The adapter plate of the combined IC card is shorter than the length in a longitudinal direction of a standard type IC card and includes a ridge formed in one side traversing the longitudinal direction and which is higher than the thickness of the combined IC card, so that two IC cards can be accommodated in the information transfer apparatus and since the ridge is provided, the IC card can be taken out easily.

DESCRIPTION OF THE PREFERRED EMBODIMENTS

Embodiments of the present invention are now described with reference to the accompanying drawings.

Figure 1:
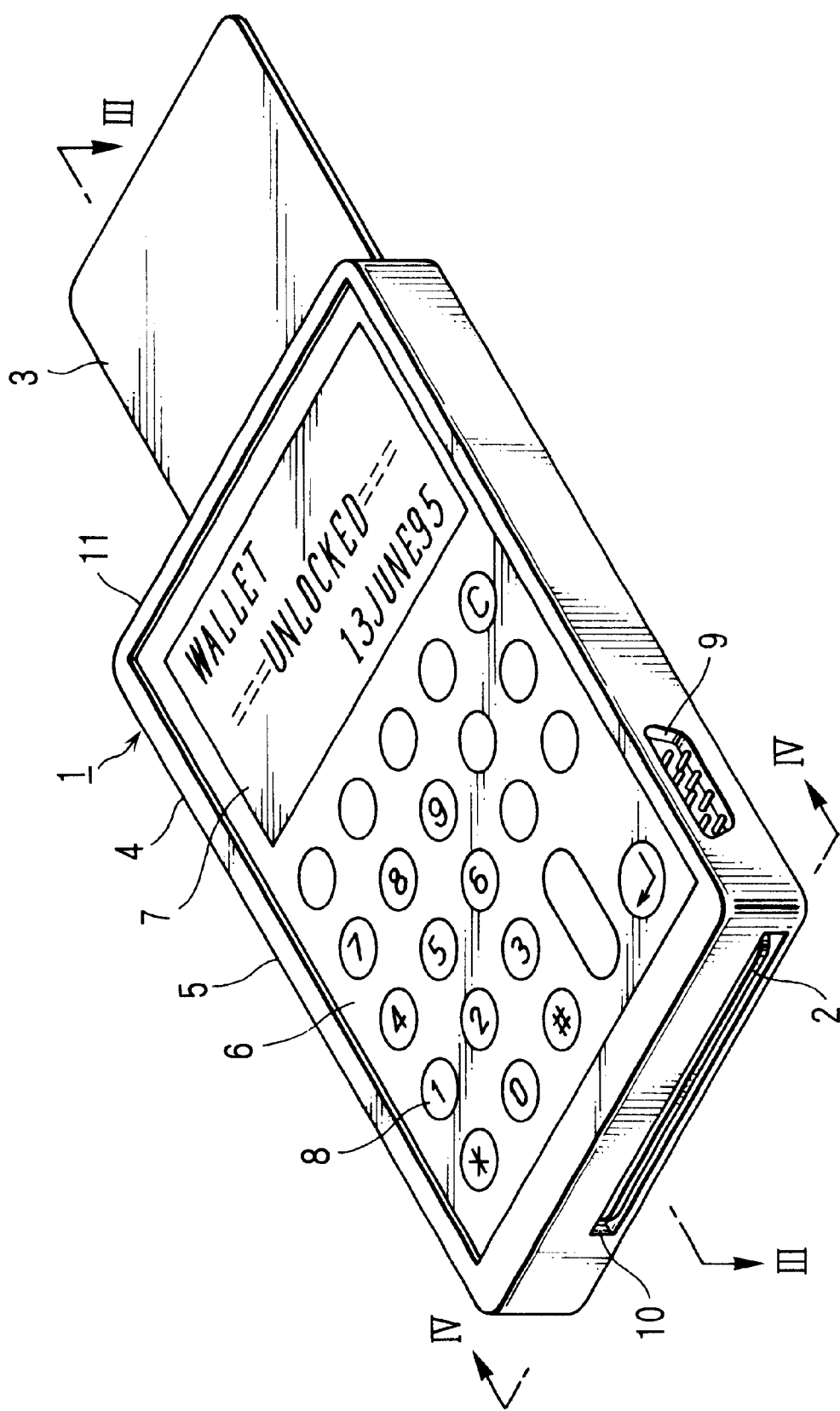
FIG. 1 is a perspective view showing an example of a portable information transfer apparatus of the present invention.

FIG. 1 is a perspective view showing an electronic purse 1 according to a first embodiment of a pocket-size information transfer apparatus of the present invention. The electronic purse 1 includes an operation unit 6 having operation keys 8 disposed at the surface of a rectangular housing 5 and a display unit 7. An insertion slot 10 is open in one end of the housing 5 so that a first IC card 2 can be inserted into the slot 10 and an insertion slot 11 is open in the opposite end of the housing 5 so that a second IC card 3 can be inserted into the slot 11. The display unit 7 is adapted to display contents prepared in accordance with operation of the operation key 8. Terminals 9 are disposed at a side portion of the housing 5 near the insertion slot 10 and a communication apparatus is connected to the terminals 9 to communicate with an external apparatus. Further, it is needless to say that a power supply not shown is included.

Figure 2:
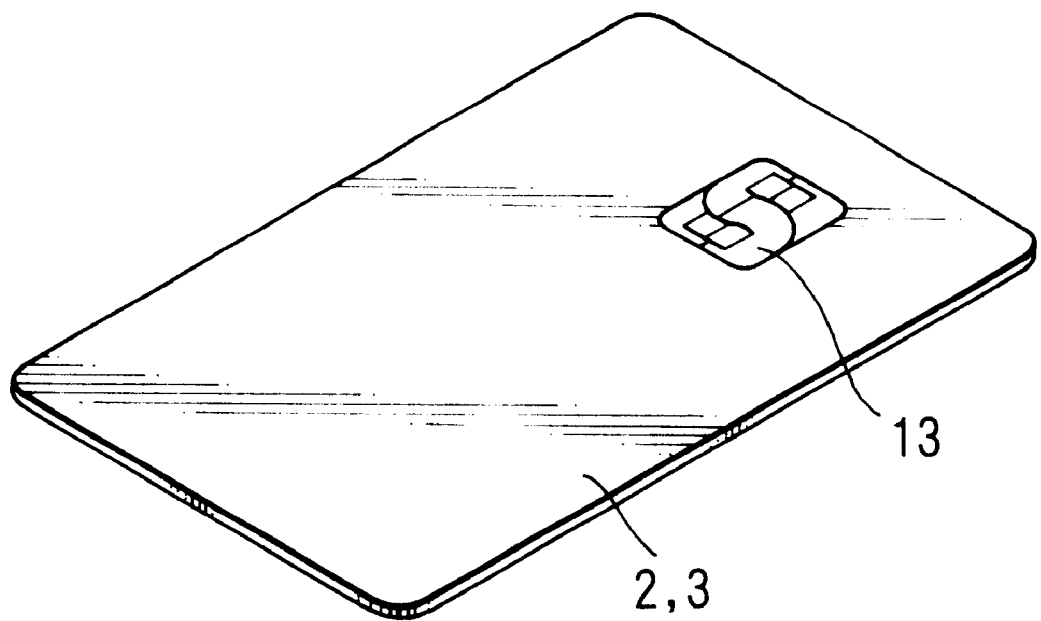
FIG. 2 is a perspective view showing an example of an IC card.

FIG. 2 is a perspective view showing an example of the first and second IC cards 2 and 3. The first and second IC cards 2 and 3 include IC circuits mounted or embedded into a plastic plate 4 having a width of about 54 mm, a length of about 85 mm and a thickness of about 0.8 mm. The position where the IC circuits are embedded is standardized and is eccentric to one side in the longitudinal direction from the center of the first and second IC cards 2 and 3. Input/output terminals 13 are exposed from the IC circuits to be brought into contact with terminals of a circuit on the side of the electronic purse 1 described later when the first and second IC cards are inserted into the respective slots 10 and 11. The IC card are described in detail later, while the first IC card 2 is owned by a person who owns the electronic purse 1 and the second IC card 3 is owned by the other party.

Figure 3:
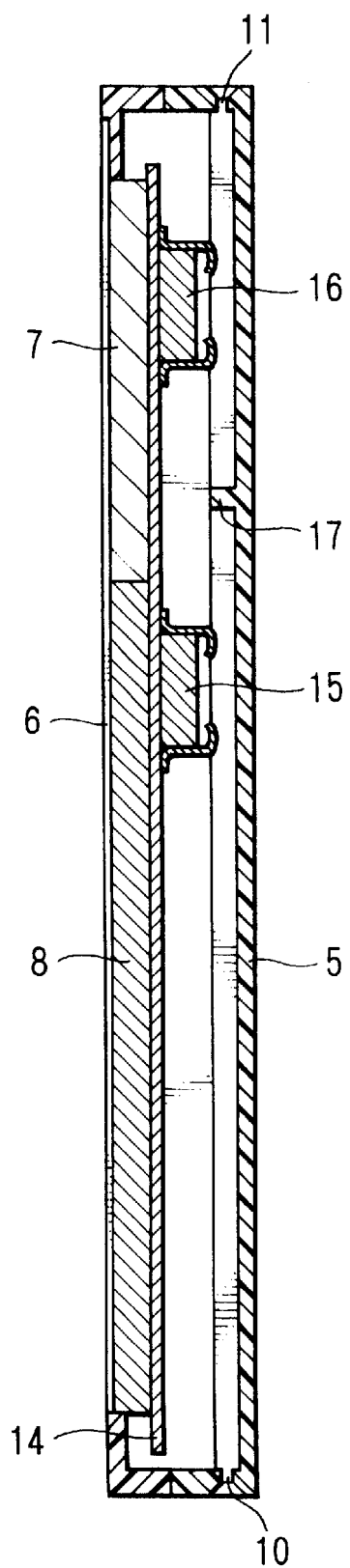
FIG. 3 is a cross-sectional view of the portable information transfer apparatus taken along line III—III of FIG. 1.

FIG. 3 is a cross-sectional view of the electronic purse 1 taken along line III—III of FIG. 1. The insertion slots 10 and 11 are open in the relatively lower portion of the housing 5 and a stopper 17 is protruded from the bottom in the housing 5 so that the first IC card 2 inserted from the insertion slot 10 and the second IC card 3 inserted from the insertion slot 11 are stopped in the housing 5. The stopper 17 is positioned so that the first IC card 2 is almost inserted into the housing 5 with part thereof being left outside and about half of the second IC card 3 is inserted into the housing 5. The display unit 7 and the operation keys 8 of the operation unit 6 are mounted on a circuit board 14 and the circuit board 14 is disposed at the relatively upper portion in the housing 5. Spring terminals 15 and 16 are protruded from the circuit board 14 toward the lower portion of the housing 5 so that the spring terminal 15 is brought into contact with the input/output terminals 13 of the first IC card 2 and the spring terminal 16 is brought into contact with the input/output terminals 13 of the second IC card 3.

Figure 4:
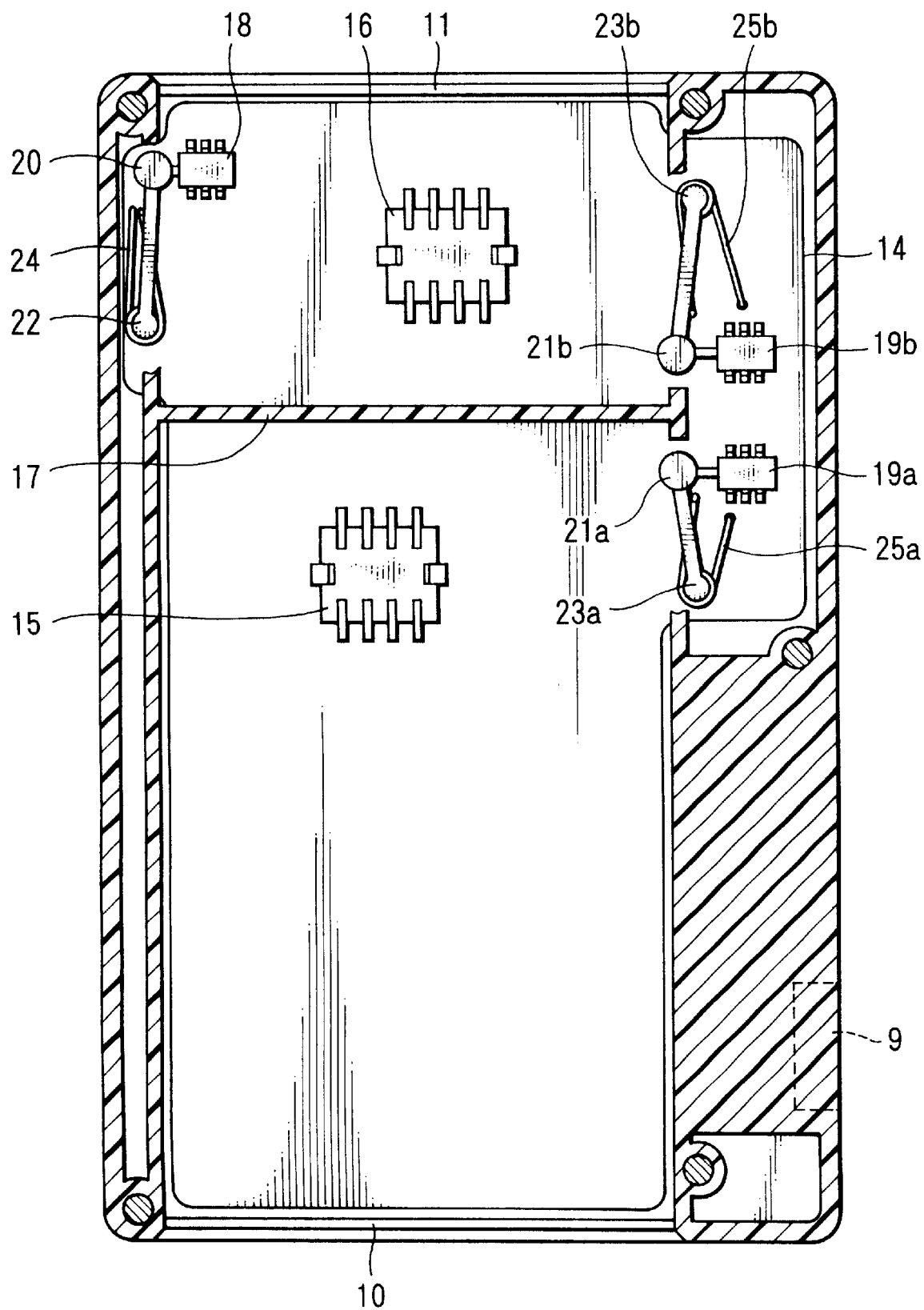
FIG. 4 is a cross-sectional view of the portable information transfer apparatus taken along line IV—IV of FIG. 1.

FIG. 4 is a cross-sectional view of the electronic purse 1 taken along line IV—IV of FIG. 1. A detection switch 19a is disposed on the circuit board 14 at the side portion of the inner portion of the housing 5 deep from the insertion slot 10 and is turned on to detect insertion of the first IC card 2 when the first IC card 2 is inserted into the insertion slot 10 and almost comes into contact with the stopper 17. Further, detection switches 18 and 19b are similarly disposed on the circuit board 14 at both the side portions in the inner portion of the housing 5 deep from the insertion slot 11 and are turned on to detect insertion of the second IC card 3 when the second IC card 3 is inserted into the insertion slot 11 and almost comes into contact with the stopper 17. When the first IC card 2 is not inserted into the insertion slot 10, a spring 25a acts to separate a lever 21a from the detection switch 19a about a fulcrum 23a, so that the detection switch 19a is off. Similarly, when the second IC card 3 is not inserted into the insertion slot 11, a spring 25b acts to separate a lever 21b from the detection switch 19b about a fulcrum 23b, so that the detection switch 19b is off. Conversely, when the first and second IC cards 2 and 3 are inserted into the insertion slots and are brought into contact with the levers 21a and 21b, respectively, the detection switches 19a and 19b are turned on. When the second IC card 3 is not inserted into the insertion slot 11, a spring 24 acts to cause a lever 20 to push the detection switch 18 about a fulcrum 22, so that the detection switch 18 is on. Conversely, when the second IC card 3 is inserted, the lever 20 act to be separated from the detection switch 18, so that the detection switch 18 is turned off.

The terminal 9 are connected to a circuit mounted on the circuit board 14 to process information concerning an amount of money. The circuit mounted on the circuit board 14 is structured as well known and includes, for example, a microprocessor, various memories and a communication processing circuit. The communication processing circuit is connected through the terminal 9 to a modem not shown so that a predetermined amount of money is read from the owner's account of a designated bank into the first IC card 2 by means of the modem and the amount information of money in the first IC card 2 is written into the owner's bank account. Further, the terminal 9 can also be connected to a printer, a facsimile and the like so that the amount information can be printed.

The modem includes general modulation and demodulation device to connect either wire or wireless network such as private or public telecommunication line, thereby, the terminal 9 of the owner side electronic purse 1 is connected to a modem and the terminal 9 of the other party side electronic purse 1 is connected to another modem, transferring the amount information, name card information, text data and the like between the owner side electronic purse and the other party side electronic purse.

Figure 5:
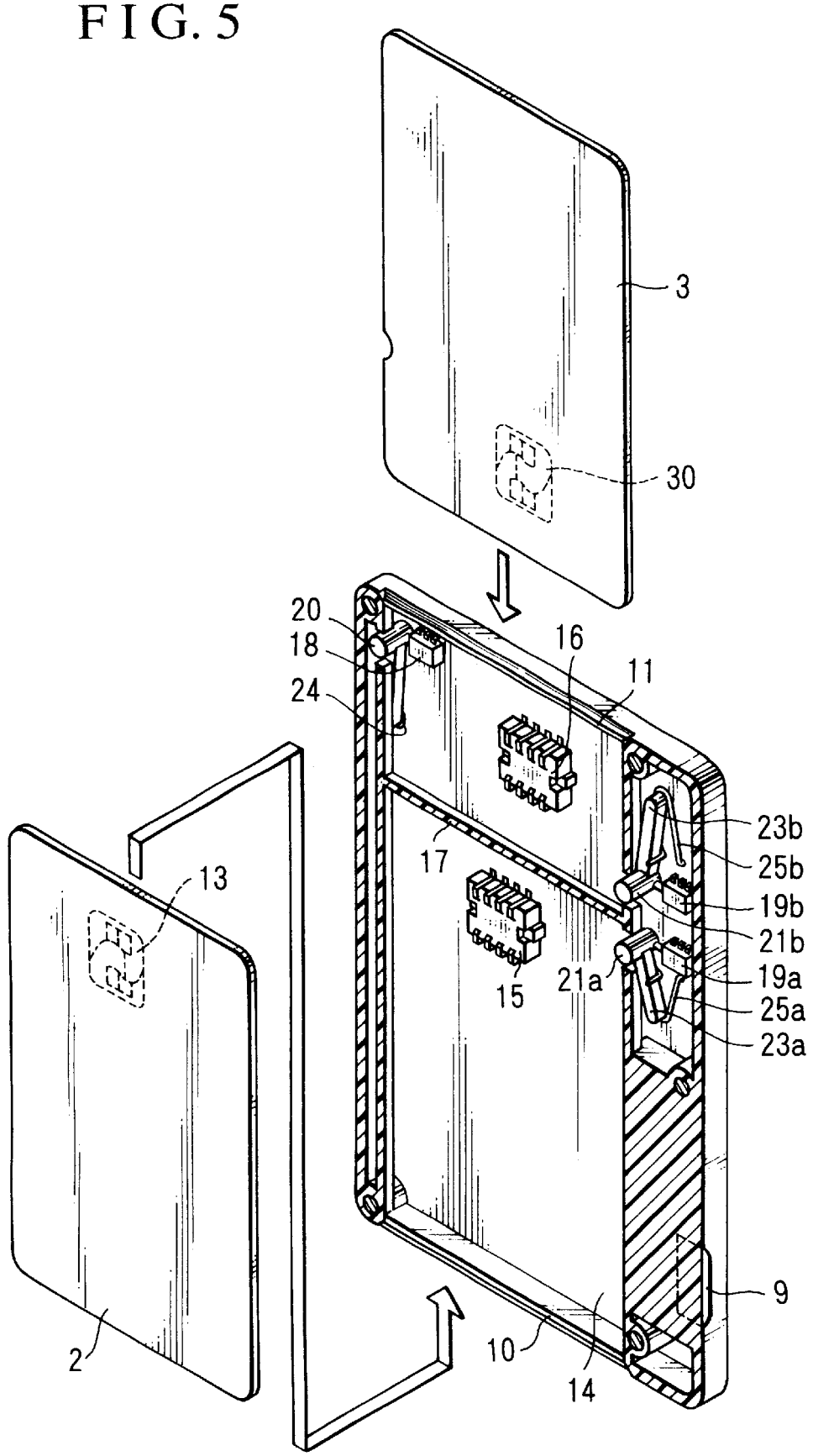
FIG. 5 is a perspective view showing a usage example of the portable information transfer apparatus.
Figure 6:
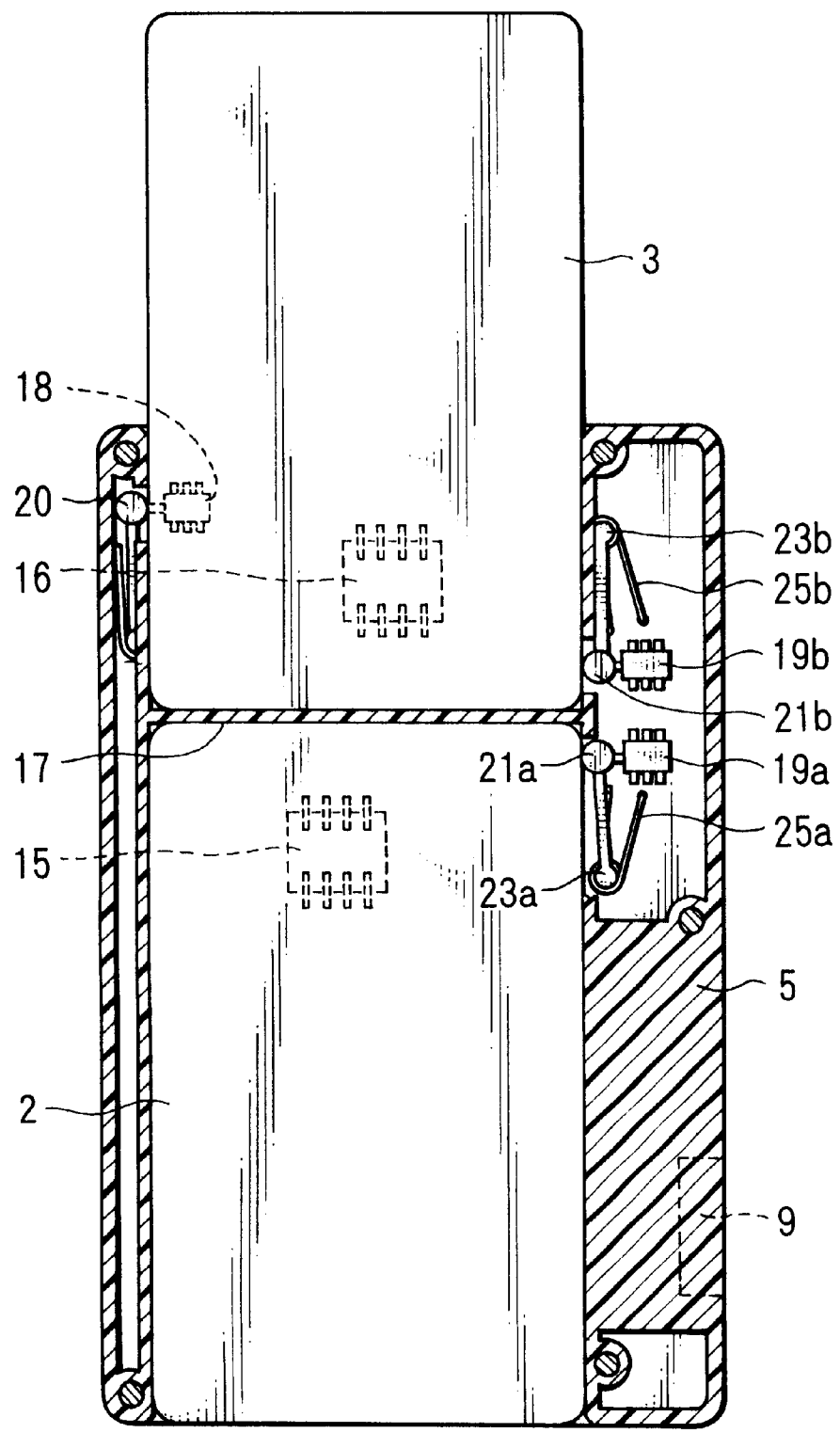
FIG. 6 is a cross-sectional view showing a usage example of the portable information transfer apparatus of FIG. 5.

FIGS. 5 and 6 illustrate a usage example of the first and second IC cards 2 and 3. The electronic purse 1 shown in FIG. 5 is identical with that shown by the cross-sectional view of FIG. 4 and FIG. 5 shows a perspective view thereof. By way of example, the first IC card 2 is owned by the owner who owns the electronic purse 1 and the second IC card 3 is owned by the other party. As shown by the arrow of FIG. 5, the first IC card 2 is inserted into the insertion slot 10 and as shown in FIG. 6 the leading end of the first IC card 2 is stopped at the stopper 17. At the same time, the input/output terminals 13 of the first IC card 2 are brought into contact with the spring terminals 15 of the electronic purse 1. As shown in FIG. 6, the edge of the first IC card 2 pushes the lever 21a to thereby turn on the detection switch 19a, so that it is detected by means of the function of the circuit board 14 that the first IC card 2 is inserted into the electronic purse 1 and the inserted IC card is not a forged card in measurement and has the regular size. The owner of the electronic purse 1 can leave the first IC card 2 inserted.

The second IC card 3 is inserted into the insertion slot 11 as shown by the arrow of FIG. 5 and the leading end of the second IC card 3 is stopped at the stopper 17 as shown in FIG. 6. At this time, the input/output terminals 13 of the second IC card 3 are brought into contact with the spring terminals 16 of the electronic purse 1. The edge of the second IC card 3 pushes the lever 21b to thereby turn on the detection switch 19b. At the same time, another edge of the second IC card 3 pushes the lever 20 to thereby turn off the detection switch 18. Thus, the circuit board 14 detects that the second IC card 3 is inserted into the electronic purse 1 and the inserted IC card 3 is not a forged card in measurement and is the ordinary IC card similarly to the first IC card 2.

Thus, when the first and second IC cards 2 and 3 are inserted into the electronic purse 1 and, for example, a predetermined amount of money is paid from the person carrying the electronic purse 1 to the other party, a function key is depressed. Then, when numerical keys are depressed to input a predetermined amount, the amount is displayed in the display unit 7 to confirm the amount. When a transfer key is depressed, the predetermined amount is transferred from the first IC card 2 to the second IC card 3. On the other hand, when a predetermined amount of money is paid from the other party to the person carrying the electronic purse 1, the function key, the numerical keys and the transfer key are operated as described above so that the predetermined amount is transferred from the second IC card 3 to the first IC card 2 reversely. Since these keys and the function thereof are well known and can be understood, description thereof is omitted.

The detection of the IC card is to detect that the IC card has the specified measurement, while additionally in order to confirm the other party and collate the other party with the person carrying the electronic purse 1, passwords are stored in the respective IC cards 2 and 3 and when a predetermined amount is transferred from the first IC card 2 to the second IC card 3 and vice versa, both the passwords may be collated by means of a program. Further, the person carrying the electronic purse 1 may store the password into a circuit of the circuit board 14 and the password of the person utilizing the electronic purse 1 may be inputted by the numerical keys for collation. In addition thereto, there are many well-known techniques for the security and since these techniques can be utilized, detailed description about the security is omitted. Further, transfer of the predetermined amount can be made by the well-known software and accordingly description thereof is omitted.

When the electronic purse 1 is possessed and the increased amount paid from the second IC card 3 to the first IC card 2 is desired to be transferred to an account of a bank, the amount may be transferred to the bank account from the terminals 9 through a modem. Further, when an amount paid from the first IC card 2 to the second IC card 3 is lacking, a predetermined amount may be transferred from the bank account through the terminals 9 and the modem to the first IC card 2.

In the example shown in FIGS. 5 and 6, the second IC card 3 is protruded from the electronic purse 1. This is a typical example in the case where the person carrying the IC card having the ordinary size utilizes the other party's electronic purse 1. The person carrying the electronic purse 1 can carry the first IC card 2 while the first IC card 2 is left inserted into the electronic purse 1.

Figure 7:
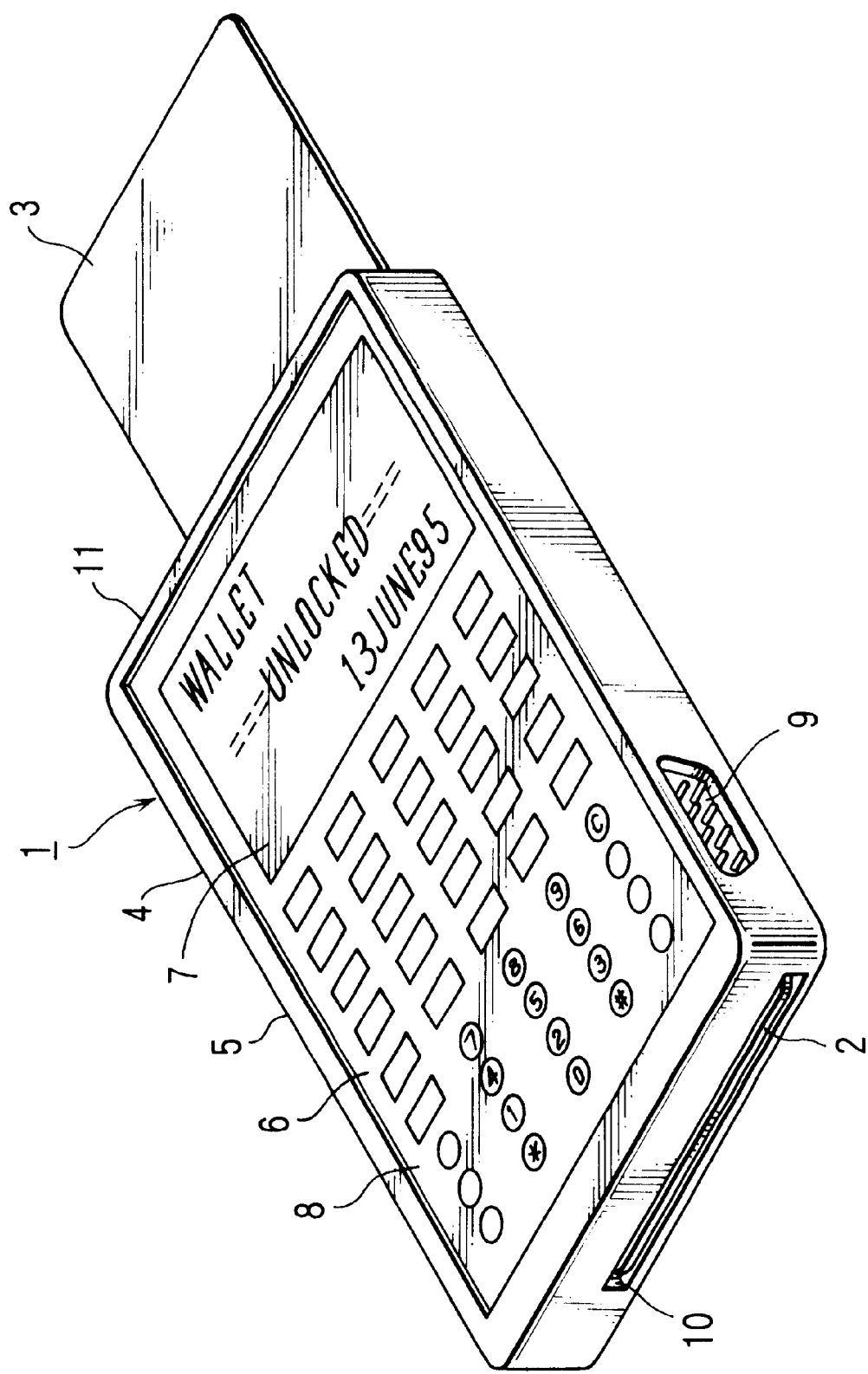
FIG. 7 is a perspective view showing another example of a portable information transfer apparatus of the present invention.

FIG. 7 shows another example of the electronic purse 1, in which the operation keys 8 disposed on the operation unit 6 include alphabetic keys. In this case, when an amount is inputted into the first IC card 2 or is taken out from the first IC card 2, the person owning the electronic purse 1 can input items from the operation keys 8, the items can be displayed in the display unit 7 and detailed information for incomings and outgoings of the amount can be provided. Even the electronic purse 1 of this type can access to a predetermined bank account from the terminals 9 through the modem. Further, when the electronic purse 1 is connected to a printer, information of the electronic purse 1 can be printed.

Figure 8:
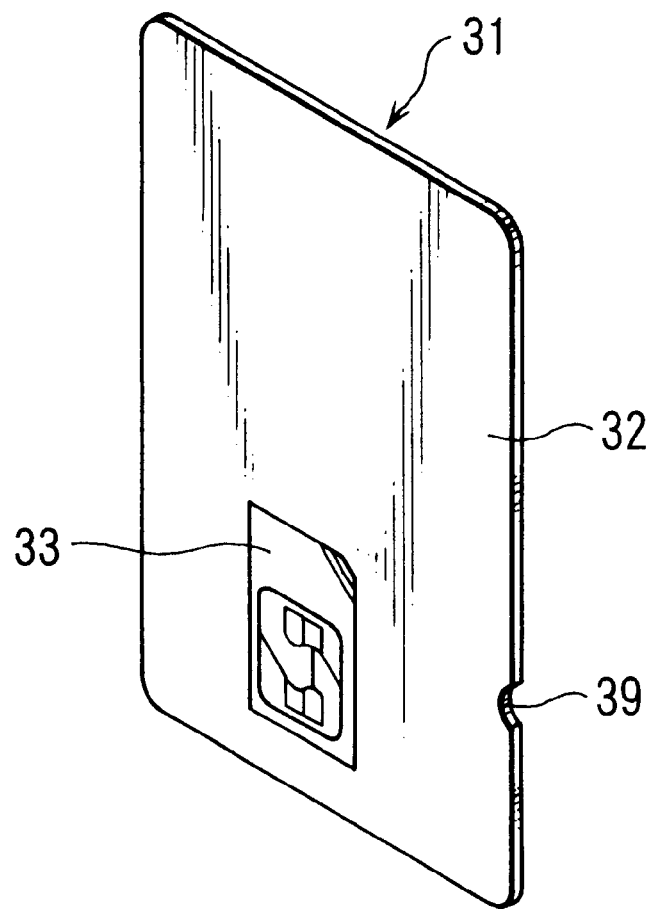
FIG. 8 is a perspective view showing an example of an IC card of the present invention.
Figure 9:
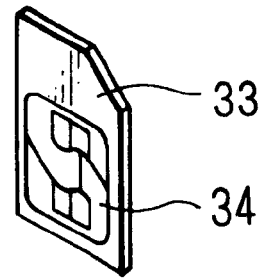
FIG. 9 is a perspective view showing a mini-IC card.

FIG. 8 shows an example of an IC card, which includes a mini-IC card 33 fitted into an adapter plate 32 made of plastic material. The mini-IC card 33 is positioned in the same location as described in the first and second IC cards 2 and 3. The adapter plate 32 has the same size as that of the first and second IC cards 2 and 3 described above and includes a notch 39 formed at one side in the longitudinal direction of the adapter plate 32. Position of the notch 39 is described later and the notch 39 is shaped to be fitted onto a round portion of the lever 20 described in FIG. 4. FIG. 9 shows the mini-IC card 33 separately. The mini-IC card 33 has the size including the width of about 15 mm, the length of about 25 mm and the thickness of about 0.8 mm and includes an IC circuit formed on a board having an obliquely cut right shoulder in FIG. 9 and an input/output terminal 34 exposed from the IC circuit. A window having the same shape as that of the mini-IC card 33 is formed in the adapter plate 32 and the mini-IC card 33 having the edge to which adhesive agent is applied is fitted into the window to form the combined IC card 31.

Figure 10:
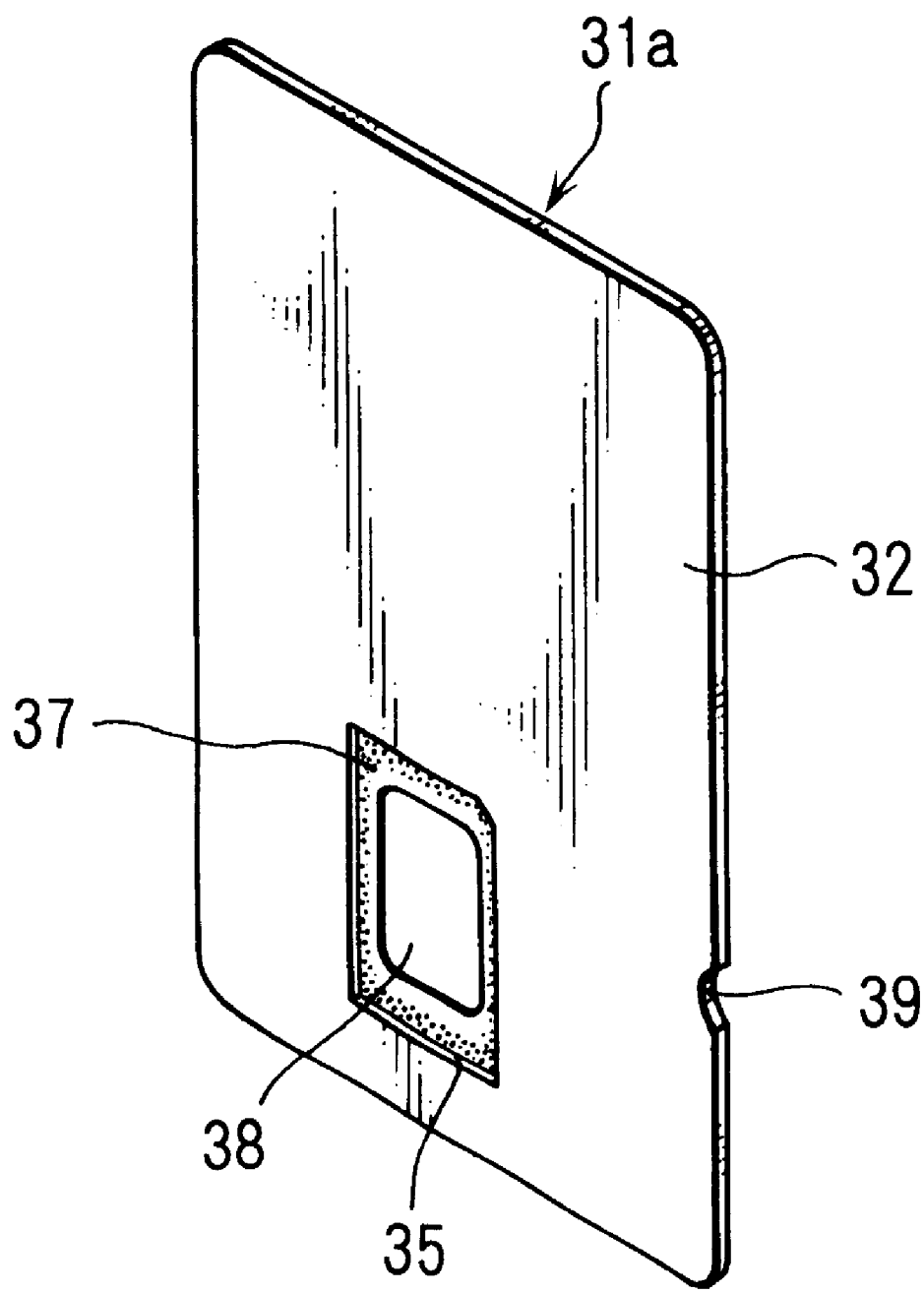
FIG. 10 is a perspective view showing another example of an IC card.

FIG. 10 shows an example of another IC card. The adapter plate 32 is the same as that shown in FIG. 8 and the notch 39 is also formed similarly. The adapter plate 32 includes a recess 35 formed in the same position as the mini-IC card 33 shown in FIG. 8 and having the same shape as that of the mini-IC card 33 and a window hole 38 formed in the recess 35 and having a shape smaller than that of the recess 35. Adhesive agent 37 is applied to the recess 35 and the mini-IC card 33 shown in FIG. 9 is attached thereon to form another combined IC card 31a. In this combined IC card 31a, the mini-IC card 33 can be removed simply by a finger through the window hole 38 from the back side of the combined IC card 31a shown in FIG. 10.

In the case of the combined IC cards 31 and 31a shown in FIGS. 8 and 10, for example, when the amount of money stored in the first and second IC cards 2 and 3 is lacking for payment, the mini-IC card in which amount information included in a portable telephone or the like is stored is detached therefrom to form the combined IC card 31 or 31a as shown in FIG. 8 or 10 as a temporary makeshift to thereby be able to make payment.

Figure 11:
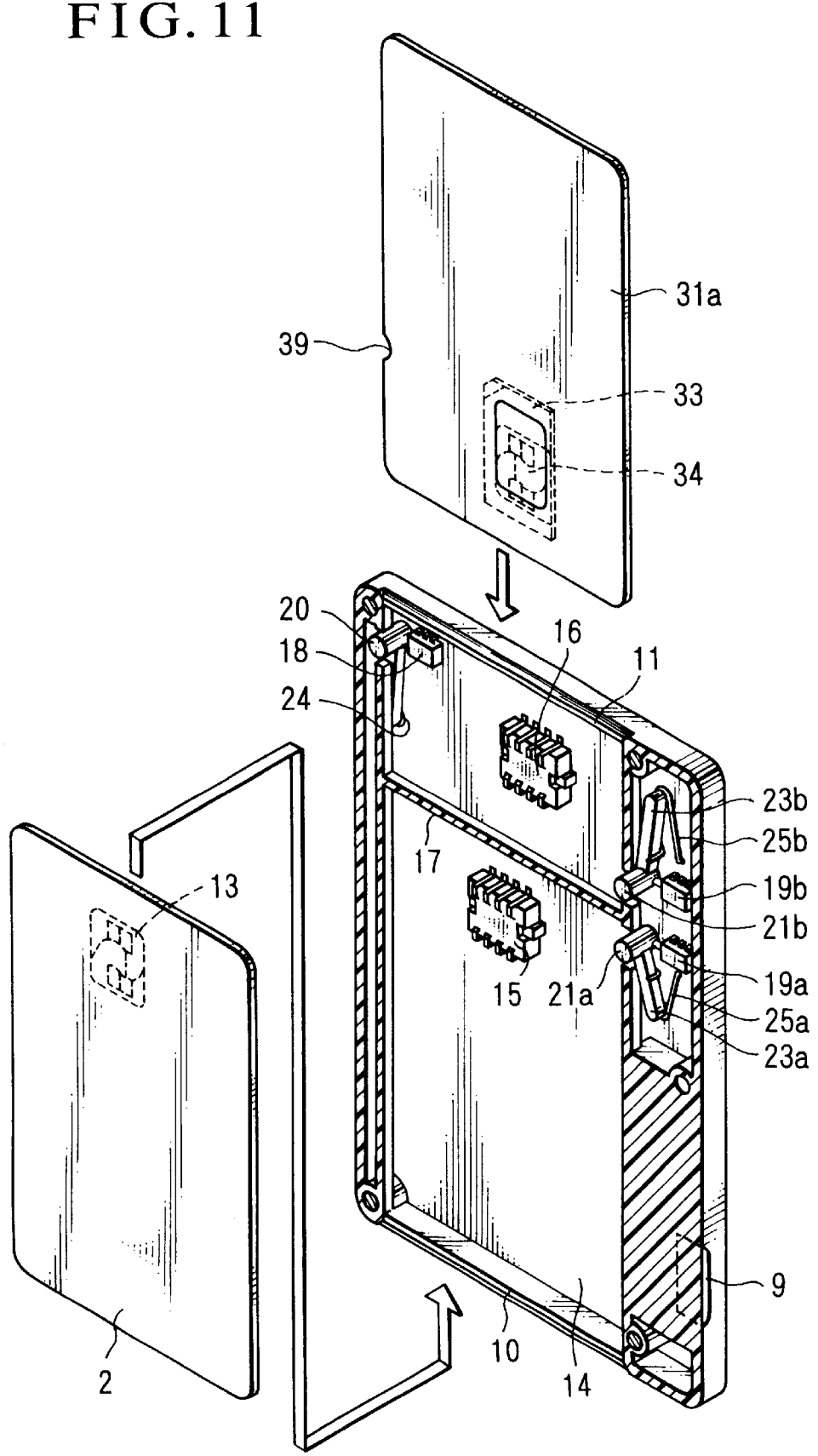
FIG. 11 is a perspective view showing another usage example of the portable information transfer apparatus.
Figure 12:
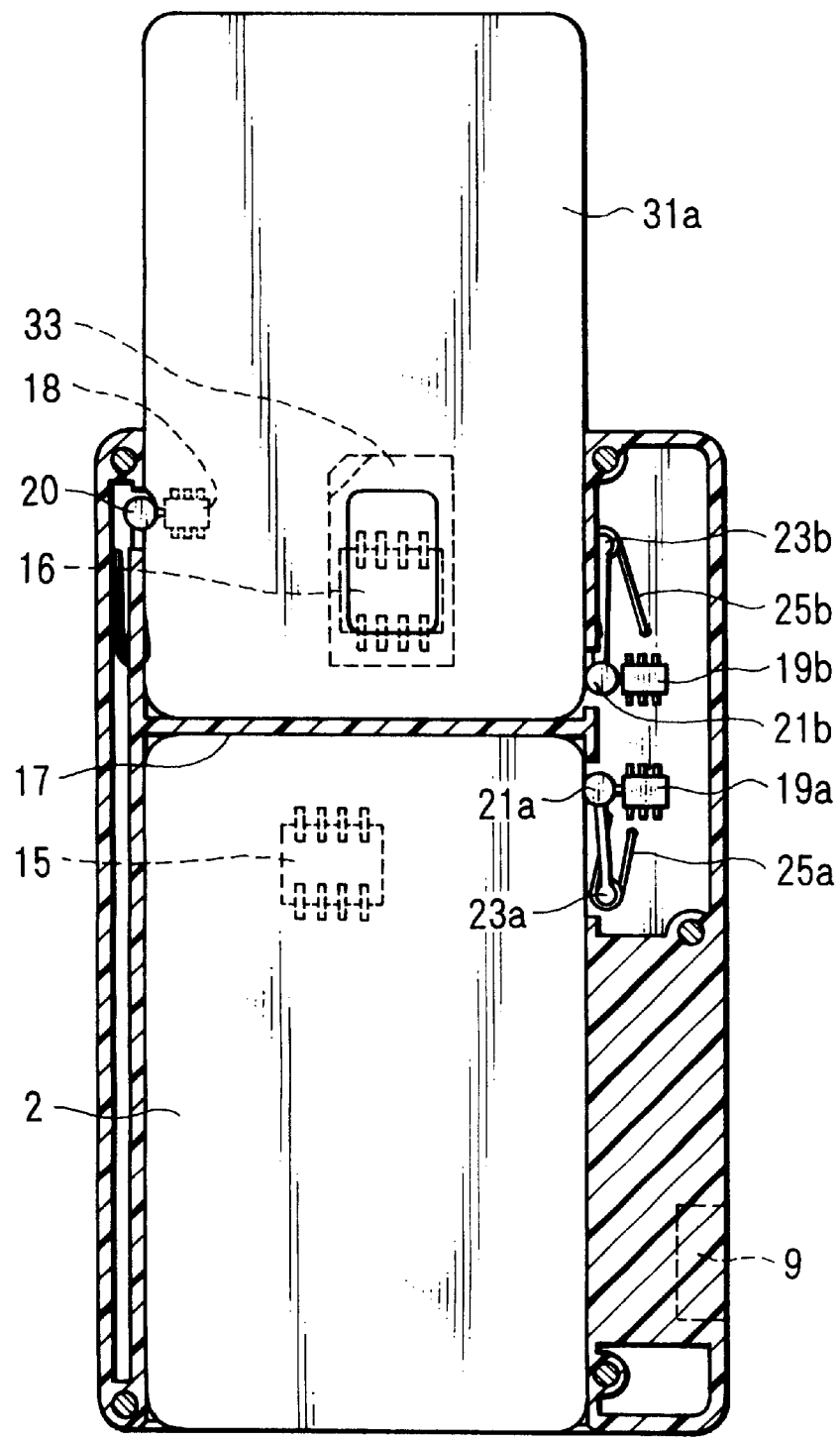
FIG. 12 is a cross-sectional view showing a usage example of the portable information transfer apparatus of FIG. 11.

FIG. 11 shows a usage example of the combined IC card 31a shown in FIG. 10 and the first IC card 2 shown in FIG. 2. The electronic purse 1 shown in FIG. 11 is identical with that of FIG. 1 and the same elements are designated by the same numerals. Description thereof is omitted. The usage of the IC card in FIG. 11 is different from the usage of the IC card described with reference to FIG. 5 as follows. The combined IC card 31a is inserted into the insertion slot 11 as shown by the arrow of FIG. 11 and the leading end of the combined IC card 31a abuts against the stopper 17 to be stopped as shown in FIG. 12. At this time, the edge of the combined IC card 31a pushes the lever 20 to turn off the detection switch 18 during insertion of the combined IC card 31a, while the notch 39 of the combined IC card 31a is fitted onto the cylindrical lever 20, the detection switch 18 is turned on in the same manner that the combined IC card 31a is not inserted, so that it can be detected that the inserted IC card is not a forged card in view of the measurement and the shape thereof.

Figure 13:
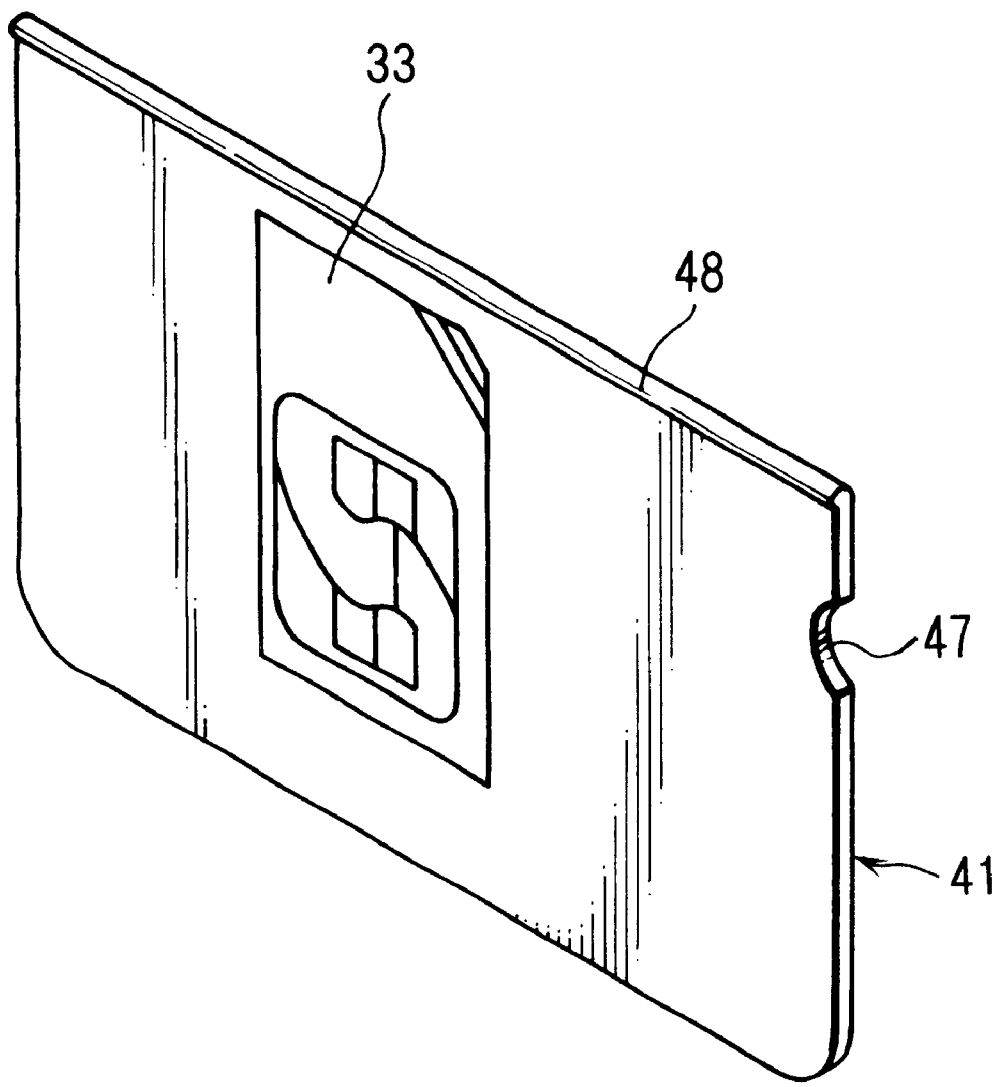
FIG. 13 is a perspective view showing another example of an IC card.

FIG. 13 shows another example of an IC card. The IC card includes the mini-IC card 33 shown in FIG. 9 and fitted into a window formed in an adapter plate 42 and having the same shape as that of the mini-IC card 33 in the same manner as described in FIG. 8. The fitting of the mini-IC card 33 into the window is attained by applying adhesive agent to the edge of the mini-IC card 33 to thereby form a combined IC card 41. The position of the mini-IC card 33 is the same position as in FIG. 8. The combined IC card 41 has the width of about 54 mm, the length of about 35 mm and the thickness of about 0.8 mm and the length thereof is shorter than that of the combined IC card shown in FIG. 8. The combined IC card 41 includes a notch 47 formed in the edge thereof at the same position from one end in the same manner as shown in FIG. 8. The combined IC card 41 further includes a ridge 48 formed on the edge of the opposite end thereof along the width direction thereof. The ridge 48 makes it easy to take out the combined IC card 41 from the electronic purse 1 after the combined IC card 41 is inserted into the electronic purse 1.

Figure 14:
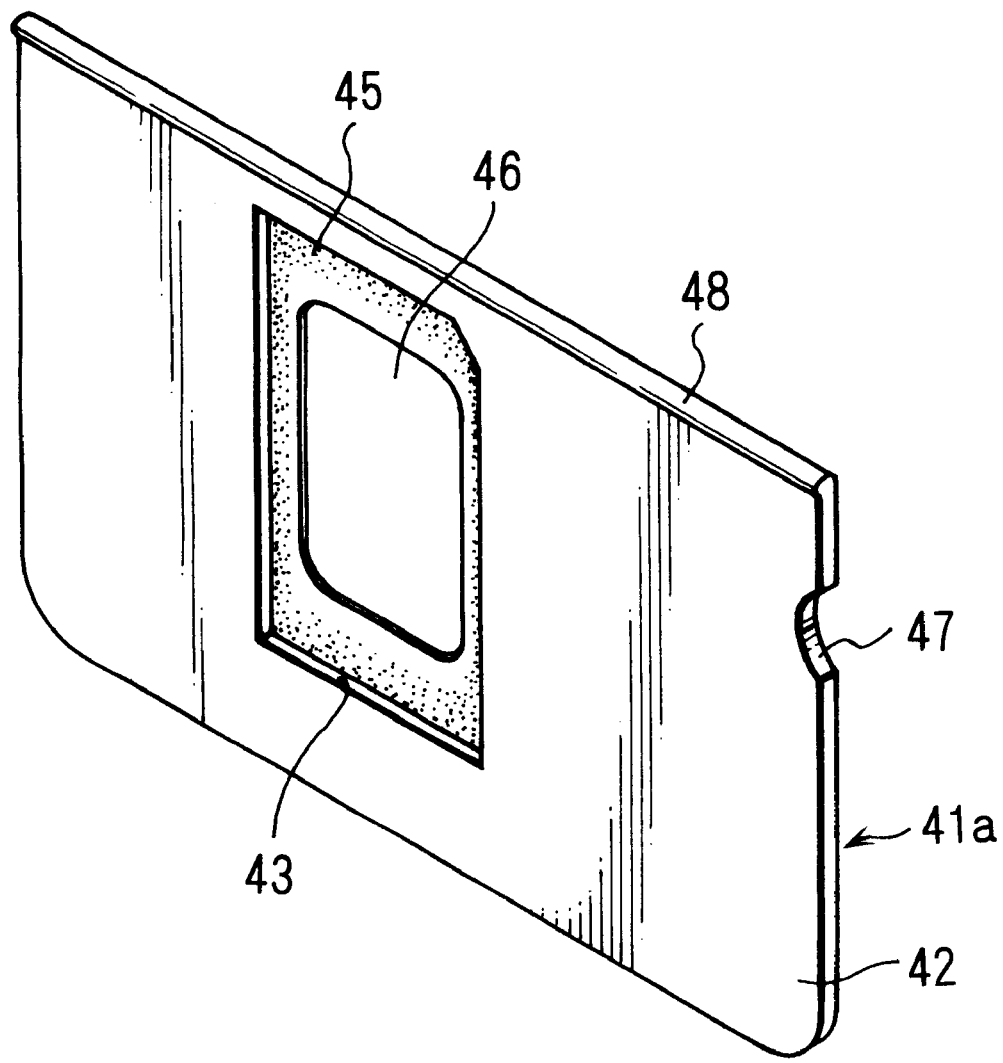
FIG. 14 is a perspective view showing another example of an IC card.

FIG. 14 shows another example of a combined IC card. The combined IC card 41a includes, in the same manner as described with reference to FIG. 10, the adapter plate 42 which is the same as shown in FIG. 13 and the notch 47 formed in the same manner as shown in FIG. 13. The adapter plate 42 includes a recess 43 formed in the same position as the mini-IC card 33 shown in FIG. 13 and having the same shape as that of the mini-IC card 33 and a window hole 46 formed in the recess and smaller than the recess 43. Adhesive agent is applied to the recess 43 and the mini-IC card 33 shown in FIG. 9 is attached thereto. In the combined IC card 41a, the mini-IC card 33 can be removed simply by a finger through the window hole 46 from the back side of the combined IC card 41a in the same manner as shown in FIG. 10.

Figure 15:
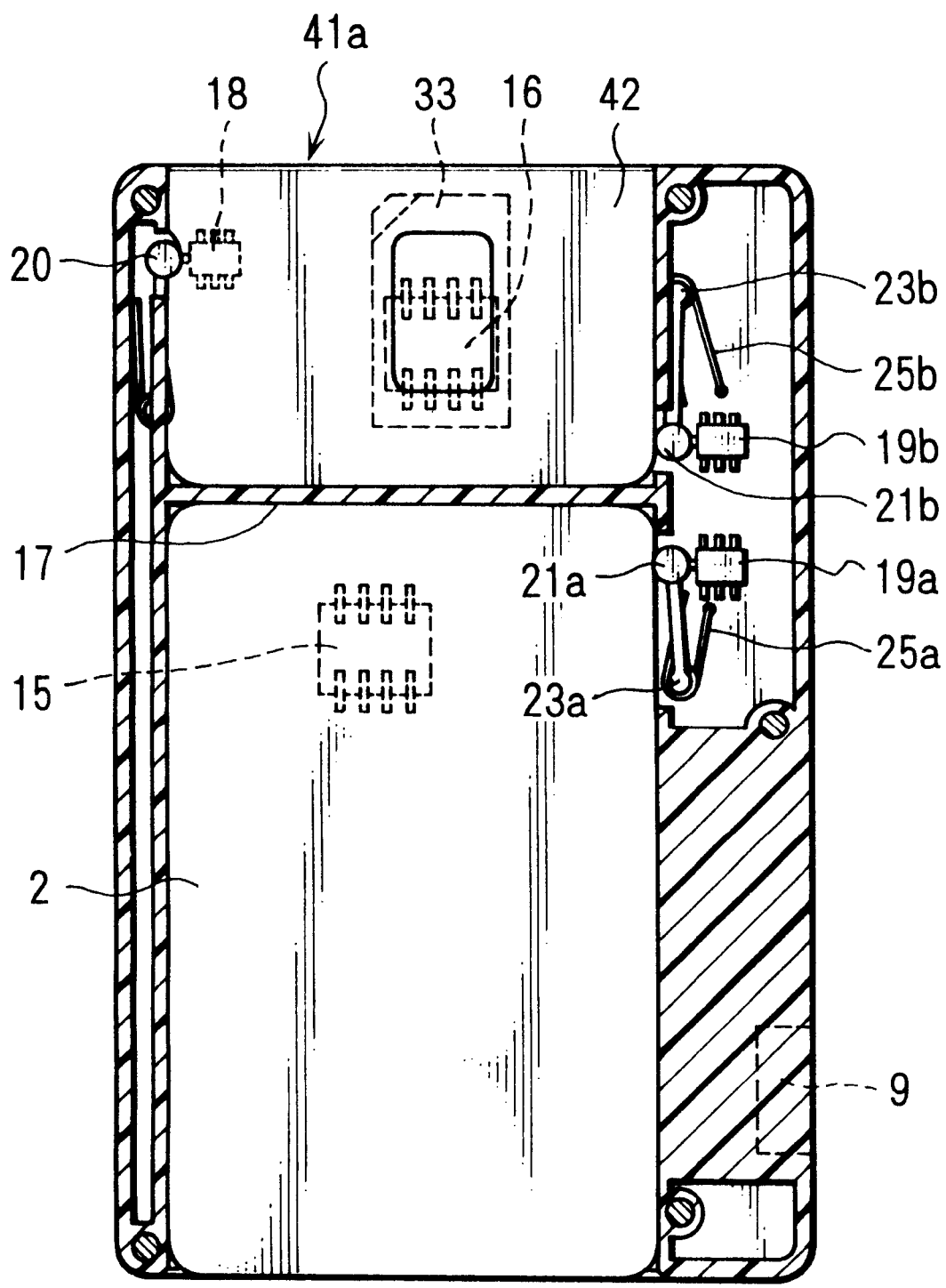
FIG. 15 is a cross-sectional view showing an example in which the IC card shown in FIG. 14 is used in the portable information transfer apparatus.

FIG. 15 shows a usage example of the combined IC card 41a and the IC card 2. Since the electronic purse 1 using the combined IC card 41a and the IC card 2 is the same as that shown in FIGS. 4 and 5, the same elements are designated by the same reference numerals and description thereof is omitted. This usage is featured in that when the combined IC card 41a is inserted into the insertion slot 11 in the same manner as described in FIG. 12, the ridge 48 of the combined IC card 41a is positioned at the substantially same plane as the position of the insertion slot 11 and the ridge 48 can be held by fingers easily to take out the combined IC card 41a from the slot. In the case of the example shown in FIG. 15, the IC card having the size of the IC card 2 is carried generally and accordingly when the combined IC card 41a or 41 is the IC card of the person carrying the electronic purse 1, the extent of using the electronic purse is wider and it is convenient to carry it. The operation of the detection switches 19a, 19b and 18 is the same as described in FIG. 4 and the operation of the notch 47 is also the same as described in FIGS. 11 and 12. Accordingly, description thereof omitted.

Figure 16:
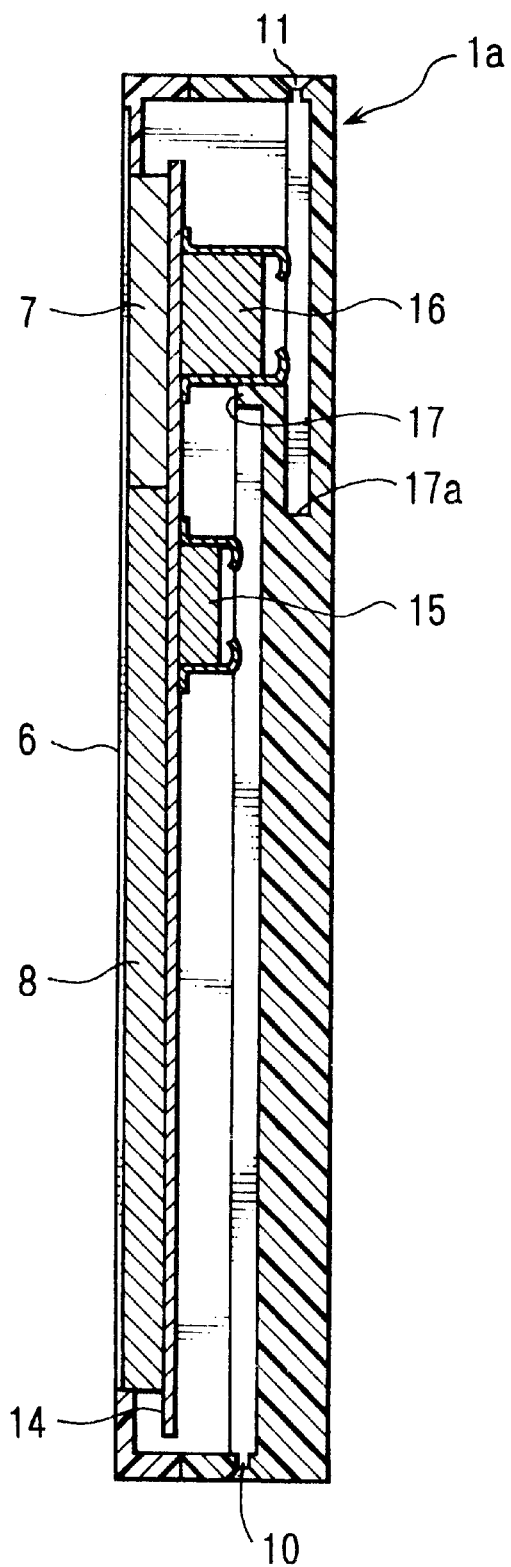
FIG. 16 is a cross-sectional view showing another example of a portable information transfer apparatus of the present invention taken along line III—III of FIG. 1.

FIG. 16 is a cross-sectional view showing an electronic purse 1a having the length in the longitudinal direction thereof shorter than that of the electronic purse 1 shown in FIGS. 3 and 4. In this structure, a distance from the insertion slot 10 to the stopper 17 is the same as that of FIG. 3 and, for example, the IC card 3, the combined IC cards 31, 31a, 41 or 41a inserted into the insertion slot 11 is partially overlapped to the IC card 2 in the housing 5. To this end, two stoppers 17 and 17a are formed. This structure can make short the distance from one end of the IC cards 2, 3 and the combined IC cards 31, 31a, 41 and 41a to the input/output terminal 13 of the IC circuit as shown in FIGS. 2, 8, 10, 13 and 14 to thereby make small the electronic purse 1. The position of the detection switch 19a, 19b, 18 and the spring terminal 16 mounted in the circuit board 14 is shifted by the shortened distance in accordance with this structure. Further, the lever 21b, the spring 25b, the lever 20 and the spring 24 are also shifted if necessary.

In the above embodiments, the electronic purses have been described by way of example. It is a matter of course that the electronic purse is utilized for payment to purchase of goods, payment of a taxi, payment of a hotel, lending and borrowing of money and the like, while personal information such as, for example, name cards, as data, can be stored in the IC card and the electronic purse can be utilized as the pocket-size information transfer apparatus to exchange the information of name cards. Further, text data in the fixed form and short text data can be stored in the IC card and the electronic purse can be utilized to transfer the data to the other party's IC card.

What is claimed is:

1. A pocket-size information transfer apparatus including two insertion slots into which IC cards for storing electronic information are inserted and reads and writes the electronic information in the two IC cards inserted into the insertion slots to thereby transfer the electronic information stored in the two IC cards, comprising:

two insertion slots provided in an owner side and an other party side respectively, and an IC card operation unit for reading and writing electronic information between two IC cards inserted into said two insertion slots in mutually different depths.

2. A pocket-size information transfer apparatus according to claim 1, wherein said two insertion slots are different from each other in depth and said two inserted IC cards are not overlapped with each other.

3. A pocket-size information transfer apparatus according to claim 2, wherein the depth of one of said two insertion slots is substantially equal to the length of said inserted IC card and the depth of the other insertion slot is shorter than the length of said inserted IC card.

4. A pocket-size information transfer apparatus according to claim 2, wherein one of said two insertion slots is formed to accommodate substantially the whole IC card therein and the other insertion slot is formed to accommodate only part of said IC card therein.

5. A pocket-size information transfer apparatus according to claim 2, wherein an owner's IC card is inserted into an insertion slot having a deeper depth, of said two insertion slots and other party's IC card is inserted into an insertion slot having a shallower depth.

6. A pocket-size information transfer apparatus according to claim 1, wherein said two insertion slots are different from each other in depth and said two inserted IC cards are overlapped with each other.

7. A pocket-size information transfer apparatus according to claim 1, wherein said IC card operation unit includes an operation portion having operation keys disposed on a surface of a substantially rectangular housing, a display unit for displaying information, and terminals formed in one side portion of said housing and connected to a modem to transmit and receive information from outside.

8. A pocket-size information transfer apparatus according to claim 7, wherein said terminals are connected to said modem which is also connected to at least one of a printer and a facsimile to print the electronic information.

9. A pocket-size information transfer apparatus according to claim 7, wherein said terminals of the pocket-size information transfer apparatus are connected to one modem and other terminals of the pocket-size information transfer apparatus are connected to the other modem thereby to transfer the electronic information between the apparatuses by using at least one of a wire and wireless network.

10. A pocket-size information transfer apparatus according to claim 7, wherein said operation keys include numerical keys and function keys.

11. A pocket-size information transfer apparatus according to claim 7, wherein said operation keys include numerical keys, function keys and alphabetic keys.

12. A pocket-size information transfer apparatus according to claim 1, wherein said IC card operation unit includes a detection switch which abuts against an edge formed along a longitudinal direction of said IC card when said IC card is inserted into said insertion slot to thereby detect said IC card and for detecting a notch formed in one side extending along the longitudinal direction of said IC card.

13. A pocket-size information transfer apparatus according to claim 1, wherein the electronic information stored in said IC card includes money information containing item names expressing incomings and outgoings, name card information and short text information.

14. A pocket-size information transfer apparatus and IC card assembly comprising:

at least one IC card including at least a microprocessor, a memory and an I/O port mounted in a plastic plate, wherein said IC card is a combined IC card comprising a mini-IC card including integrated circuits for storing at least electronic information and mounted in a board and an adaptor plate for mounting said mini-IC card; and a pocket-size information transfer apparatus including two insertion slots provided in an owner side and an other party side respectively, and an IC card operation unit for reading and writing electronic information between two IC cards inserted into said two insertion slots in mutually different depths.

* * * * *